Aug. 1, 1950            E. G. LINDER         2,517,120
METHOD OF AND MEANS FOR COLLECTING ELECTRICAL
ENERGY OF NUCLEAR REACTIONS
Filed June 25, 1946
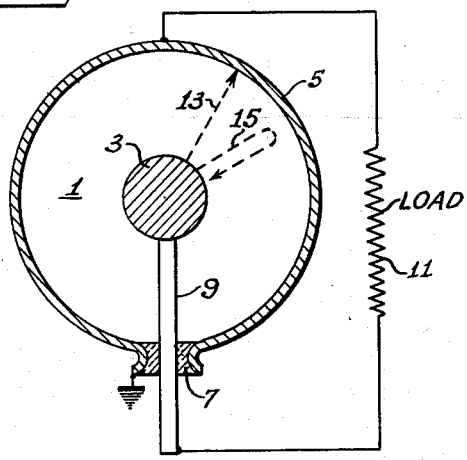
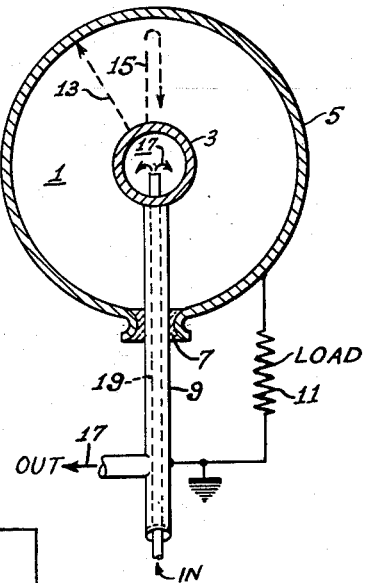
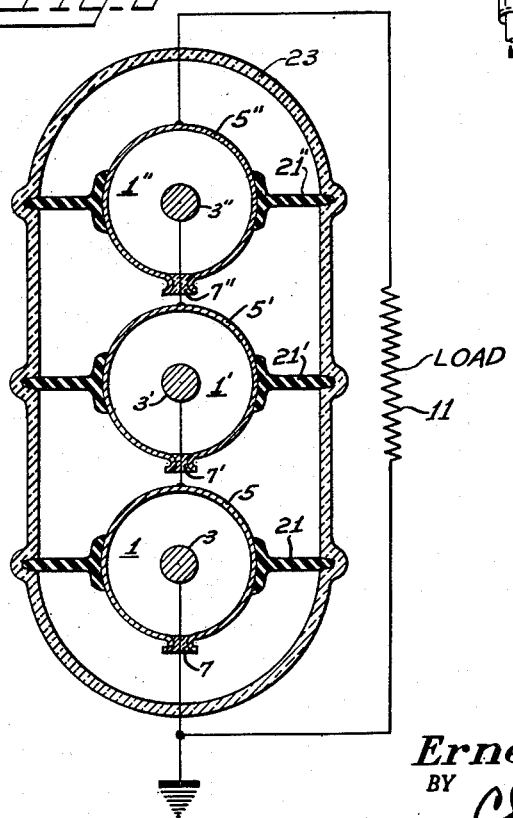
INVENTOR.
Ernest G. Linder
BY
ATTORNEY Patented Aug. 1, 1950

2,517,120

UNITED STATES PATENT OFFICE 2,517,120

METHOD OF AND MEANS FOR COLLECTING ELECTRICAL ENERGY OF NUCLEAR REACTIONS

Ernest G. Linder, Princeton, N. J., assignor to Radio Corporation of America, a corporation of Delaware Application June 25, 1946, Serial No. 679,081

12 Claims. (Cl. 171—330)

This invention relates generally to the generation of electrical energy and more particularly to unique methods of and means for deriving and utilizing the electrical energy of nuclear reactions.

The enormous magnitudes of energy provided by certain nuclear reactions of radioactive substances provide a tremendous field for the development of new sources of electrical energy. Since some radioactive radiations (energy) are largely electrical in nature, it is desirable that such electrical energy be converted directly to electrical energy of usable form. The alpha-particle and beta-particle emissions from certain radioactive substances comprise positively or negatively charged particle rays, respectively, having energies which vary from low values to several million electron volts. For example, alpha-ray emission comprises positively charged particles having energies varying from zero to the order of ten million electron volts, while beta-particle emission comprises negatively charged particles having energies varying from low values to the order of three million electron volts. Different radioactive substances are known to provide either alpha-particle emission, beta-particle emission, or a combination of alpha-particle and beta-particle emission. The direct utilization of the high electrical potentials which may be derived from such charged particles provides much more convenient and efficient utilization of nuclear energy than previously proposed systems wherein the nuclear energy is converted to thermal energy, the thermal energy converted to mechanical energy, and the mechanical energy then converted to electrical energy in a usable form. Also, the direct utilization of the electrical energy of nuclear reactions may be much more readily controlled by electrical methods than may the conversion of nuclear energy to thermal energy.

The instant invention contemplates the use of collector electrodes for collecting the charged particle rays from a radioactive source, and means for applying the resultant unidirectional potential between the source and collector electrodes to a load.

Among the objects of the invention are to provide improved methods of and means for generating electrical energy in response to nuclear reactions. Another object is to provide improved methods of and means for utilizing the electrical energy in nuclear reactions for generating high unidirectional potentials. An additional object is to provide improved methods of and means for utilizing atomic energy for generating electrical energy. A still further object of the invention is to provide improved methods of and means for utilizing radioactive materials as sources of electrical energy.

Another object of the invention is to provide improved methods of and means for converting atomic energy directly to electrical energy in commercially usable forms. A further object is to provide improved methods of and means for utilizing either alpha-ray or beta-ray emission, or both, of nuclear reactions of radioactive materials for generating charged particle beams.

The various embodiments and features of the invention will be described in detail hereinafter by reference to the accompanying drawing of which Figure 1 is a schematic diagram of a first embodiment of the invention including a simple unidirectional voltage generator; Figure 2 is a schematic diagram of a second embodiment of the invention; and Figure 3 is a schematic diagram of a third embodiment of the invention. Similar reference characters are applied to similar elements throughout the drawing.

High-voltage D.-C. generators

Referring to the drawing, Figure 1 illustrates the simplest form of the invention comprising a unidirectional high voltage generator 1. The generator 1 includes a source 3 of alpha-rays or beta-rays derived from a quantity of radioactive material. A suitable alpha-ray radioactive source may comprise, for example, a quantity of polonium. Likewise, a suitable beta-ray source may comprise a suitable quantity of radioactive phosphorus ($_{15}P^{32}$), a pure beta-ray emitter which becomes stable after emission. These materials are suitable for use as electronic power sources since they emit no gaseous reaction products and, therefore, are suitable for vacuum applications.

One gram of radioactive phosphorus occupies about .5 cubic centimeter and will emit about 2 milliamperes of electron current. The maximum energy of the beta rays is of the order of 1.7 million electron volts, but only a small fraction of the electron current would be available at such a high voltage. However, about 1 milliampere of current would be emitted at one megavolt. Since the average energy of emission would be about 1 million electron volts, the total rate of electrical energy production or power generated would be about 2 kilowatts. The half-life period of radioactive phosphorus ($_{15}P^{32}$) is about 14 days, and the current and power would decrease exponentially to one-half their initial values in that time.

The radioactive source 3 is surrounded, for example, by a spherical, highly evacuated, conductive collector electrode 5 having an aperture insulator 7 therein for a suitably insulated terminal 9 for the radioactive source 3. A load 11 is connected between the collector electrode 5 and the source terminal 9. If desired, the collector electrode 5 may be grounded.

In operation, and in the absence of a load, beta particles (electrons) emitted by the radioactive source 3 travel to the collector electrode 5 and charge it negatively as indicated by the dash line arrow 13. The charge upon the collector electrode is negative with respect to the source 3 and increases until the potential of the collector electrode is sufficiently high to repel additional electrons arriving from the source 3, as shown by the dash line arrow 15. If it is assumed that the radioactive source 3 emits 1 megavolt electrons (beta rays), the potential of the collector electrode 5 would reach one megavolt and would be negative with respect to the radioactive source. If a load is connected between the collector electrode and the source terminal, a current will flow through the load and power will be dissipated therein. Thus the radioactive energy emitted in the beta rays may be employed directly in its original electrical form to provide electrical energy.

Known beta-ray emitters provide electrons having energies from almost zero to 3 million electron volts. Known alpha-ray emitters provide positively charged alpha particles having energies from about zero to the order of 10 million electron volts. If desired, an alpha-particle source may be employed instead of a beta-particle source, in which case the collector electrode 5 will be charged positively until it reaches a potential sufficiently high to repel additional alpha particles. In such a modification of the invention, the collector electrode 5 becomes the positive terminal and the radioactive source 3 the negative terminal of the generator.

The electric current produced by any source of charged particles is $$i = e \frac{dn}{dt} \quad (1)$$

where $n$ is the number of particles emitted, $t$ is the time in seconds, and therefore $dn/dt$ is the rate of particle emission, and $e$ is the electrical charge per particle. If each particle carries more than one electronic charge, $e$ must be replaced by $\mu e$, where $\mu$ is the number of charges.

For a radioactive substance $$dn/dt = -\lambda n \quad (2)$$

(see Pollard and Davidson, Applied Nuclear Physics, p. 105), where $\lambda$ is the decay constant and is related to the half life $t_H$ by $$\lambda = \frac{0.693}{t_H} \quad (3)$$

From Equations 1, 2 and 3 it is seen that $$i = -\mu e n \frac{0.693}{t_H} \quad (4)$$

The number of atoms contained in a substance of mass M and atomic weight A is $$n = \frac{M}{m_H A} \quad (5)$$

where $m_H$ is the mass of the hydrogen atom. Thus $$i = -\mu \frac{0.693 \, Me}{m_H A t_H} \quad (6)$$

This relation may be expressed in amperes per gram for a predetermined quantity of a radioactive substance wherein $e = 1.59 \times 10^{-19}$ coulombs, $M = 1$ gram, $m_H = 1.66 \times 10^{-24}$ grams, and $t_H = 8.64 \times 10^4 T_H$, where $T_H$ is the half life in days. Therefore, $$i_1 = \frac{0.76 \mu}{A T_H} \quad (7)$$

If the radioactive source is polonium, $A = 210$ and $T_H = 140$, $\mu = 2$, therefore $$i_1 = \frac{0.76 \times 2}{210 \times 140} = 51.8 \, 10^{-6} \text{ amps./gram} \quad (8)$$
$$= 51.8 \text{ microamps./gram}$$

The characteristics of the charged particle emitting substance determine not only the output voltage of the generator, but also determine its impedance. Thus, since alpha particles generally have a very uniform energy, providing the source is a very thin element, the generated voltage would remain substantially constant until all the remaining current was drawn, whereupon the voltage would decrease rapidly. Thus, with an alpha-particle emitter, the generator would have a low effective internal impedance. In contradistinction thereto, beta particles are usually emitted over a wide energy range which may vary from a very low value to several million electron volts. Consequently, when current is drawn from the generator to a load, the load voltage would immediately drop to a much lower value than the no load maximum, as is characteristic of all generators having high internal impedance. The actual variation of load voltage with current would depend upon the particular characteristics of the beta-ray emitting material. In general the available power depends upon the quantity of radioactive material employed and upon its rate of particle emission. Materials which emit at high rates have short operating life, while materials emitting at low rates have relatively longer operating lives. A D.-C. generator of the type described has particular application for systems requiring high voltage and low power capacity since in such instances only a relatively small amount of radioactive material is required for the alpha- or beta-ray source.

*Cooling of electrodes*

For generators providing relatively large power values, cooling of the charged particle source may be necessary or desirable since the source is bombarded and heated by the returning charged particles which are reflected by the charged collector electrode. Also the collector electrode is heated by the charged particles which it collects. A simple system for cooling the charged particle emitter is shown in Figure 2 wherein the charged particle source 3 comprises a relatively thin shell of radioactive material into which air or water under pressure may be forced for cooling purposes as indicated by the arrows 17. The radioactive source terminal 9 may comprise a hollow tube forming a cooling fluid outlet and a coaxially disposed inner tube 19 forming a cooling fluid inlet. If desired, the collector electrode 5 may be cooled by air blasts.

*Multiple stage D.-C. generator*

Referring to Figure 3, a multiple stage high voltage D.-C. generator may be provided by connecting in series several units of the type described heretofore by reference to Fig. 1. The only limits to the number of units which may be serially connected are those of insulation breakdown and practical mechanical construction. For example, three such serially connected units $1$, $1'$, $1''$ supported, respectively, by brackets $21$, $21'$ and $21''$, are enclosed within an evacuated envelope $23$. The collector $5$ of the unit $1$ is connected to the source $3'$ of the unit $1'$, and the collector $5'$ of the unit $1'$ is connected to the source $3''$ of the unit $1''$. The load $11$ is connected between the source $3$ of the unit $1$ and the collector $5''$ of the unit $1''$. A very high degree of vacuum is essential to prevent ionization within the evacuated chamber and within the several units. For protection against X-ray emission or other harmful radiation, the collector electrodes $5$, $5'$ and $5''$ should be sufficiently thick to absorb practically all such radiation. Metal electrodes having a thickness of several millimeters should be sufficient in most cases. Also the envelope $23$ may be of metal or other radiation absorptive material in order further to minimize danger from such harmful radiation.

Following is a partial list of alpha- and beta-ray emitters which are suitable for high voltage generators of the types described heretofore:

| Element | Half-life, days | Energy (equivalent million electron volts) |
|---|---|---|
| ALPHA-RAY EMITTERS | | |
| Polonium ($Po^{210}$) | 140 | 5.25 |
| Actinium ($Ac^{223}$) | 11.2 | 5.66 |
| Thorium X ($Th\ X^{224}$) | 3.64 | 5.65 |
| Radio actinium ($Rd\ Ac^{227}$) | 18.9 | 5.92 |
| BETA-RAY EMITTERS | | |
| Phosphorus ($P^{32}$) | 14 | 1.7 |
| Calcium ($Ca^{45}$) | 180 | 0.2 |
| Scandium ($Sc^{46}$) | 85 | 0.9 / 0.26 / 1.5 |
| Iron ($Fe^{59}$) | 47 | 0.4 / 0.9 |
| Arsenic ($As^{74}$) | 16 | 1.3 |
| Strontium ($Sr^{89}$) | 55 | 1.5 |
| Antimony ($Sb^{124}$) | 60 | 1.53 |
| Tungsten ($W^{185}$) | 77 | 0.5 |

Thus the invention disclosed and claimed herein comprises unique methods of and means for generating extremely high unidirectional potentials by utilizing directly the electrical properties of radioactive emission. Such generators may provide high or low potentials at substantial power. Either alpha- or beta-ray emission may be utilized. Means for cooling the generator is provided. A system for cascading a plurality of such generators is disclosed.

I claim as my invention:

1. The method of utilizing a source of radioactive charged particle radiations for primarily generating electrical energy comprising collecting said charged particle radiations on a surface region adjacent to said source to establish a potential with respect to said source and deriving an electric current in response to said potential.

2. The method of utilizing a source of radioactive radiations including alpha particles for primarily generating electrical energy comprising collecting said alpha particles on a surface region adjacent to said source to establish a voltage with respect to said source and deriving an electric current in response to said voltage.

3. The method of utilizing a source of radioactive radiations including beta particles for primarily generating electrical energy comprising collecting said beta particles on a surface region adjacent to said source to establish in said region a voltage with respect to said source and deriving an electric current in response to said voltage.

4. The method of utilizing a plurality of sources of radioactive charged particle radiations for primarily generating high voltage electrical energy comprising separately collecting said radiations in surface regions adjacent to each of said sources to establish potentials with respect to each of said sources, combining said potentials, and deriving an electric current in response to said combined potentials.

5. Apparatus for primarily generating electrical energy including a source of radioactive material providing charged particle cold high energy emission, electrode means disposed in a region adjacent to said source for collecting said emitted particles to establish a potential with respect to said source, source connection means insulated from said electrode means, and means connected to said source connection means and to said electrode means for deriving a load current in response to said potential.

6. Apparatus for primarily generating electrical energy including a source of radioactive material providing alpha-particle cold high energy emission, electrode means substantially surrounding and adjacent to said source for collecting said emitted particles to establish a potential with respect to said source, source connection means insulated from said electrode means, and means connected to said source connection means and to said electrode means for deriving a load current in response to said potential.

7. Apparatus for primarily generating electrical energy including an anode including a source of radioactive material providing beta-particle cold high energy emission, cathode means substantially surrounding and adjacent to said source for collecting said emitted beta-particles to establish a potential with respect to said source, source connection means insulated from said electrode means, and means connected to said source connection means and to said electrode means for deriving a load current in response to said potential.

8. Apparatus for primarily generating electrical energy including a source of radioactive material providing charged particle cold high energy emission, an electrode disposed in a region adjacent to and substantially surrounding said source for collecting said emitted particles to establish a potential with respect to said source, source connection means insulated from said electrode means, and means connected to said source connection means and to said electrode means for deriving a load current in response to said potential.

9. Apparatus according to claim 8 including means for grounding said electrode.

10. Apparatus according to claim 8 including means for grounding said source and means for cooling said source.

11. Apparatus for primarily generating electrical energy including a hollow body source of radioactive material providing charged particle cold high energy emission, electrode means substantially surrounding and adjacent to said source for collecting said emitted particles to establish a potential with respect to said source, source connection means insulated from said electrode means, means connected to said source connection means and to said electrode means for deriving a load current in response to said potential, and means extending through said collecting electrode connection means into said hollow body for cooling said source.

12. Apparatus for primarily generating electrical energy including a plurality of sources of radioactive material each providing charged particle emission, separate collector electrode means adjacent to and substantially surrounding each of said sources for collecting said emitted particles to establish separate potentials with respect to each of said sources, separate source connection means insulated from each of said respective surrounding collector means and connected to another of said collector means for serially combining said potentials, and means connected to said serially connected source and collector means for deriving a load current in response to said combined potentials.

ERNEST G. LINDER.

REFERENCES CITED

The following references are of record in the file of this patent:

UNITED STATES PATENTS

| Number | Name | Date |
| --- | --- | --- |
| 1,143,327 | Snook et al. | June 15, 1915 |
| 1,230,708 | Hewitt | June 19, 1917 |
| 1,670,483 | Rentschler | May 22, 1928 |
| 1,747,063 | Dushman | Feb. 11, 1930 |
| 2,032,545 | McElrath | Mar. 3, 1936 |

FOREIGN PATENTS

| Number | Country | Date |
| --- | --- | --- |
| 309,241 | Great Britain | Apr. 11, 1929 |
| 598,525 | France | Sept. 29, 1925 |

OTHER REFERENCES

Physical Review, vol. 69, June 15, 1946, page 666.

Electrical Engineering, June 1941, page 255.

Proceedings of the Royal Society of London, vol. A88, pages 471–476 (1913), by Moseley.

Comptes Rendu, Acad. Sci. USSR, vol. 47, page 332, by Lobaner et al. (1945).